June 9, 1936. C. E. BENNETT 2,043,227
LEAK INDICATING APPARATUS FOR OIL FILLED ELECTRIC POWER CABLES
Filed Jan. 20, 1934
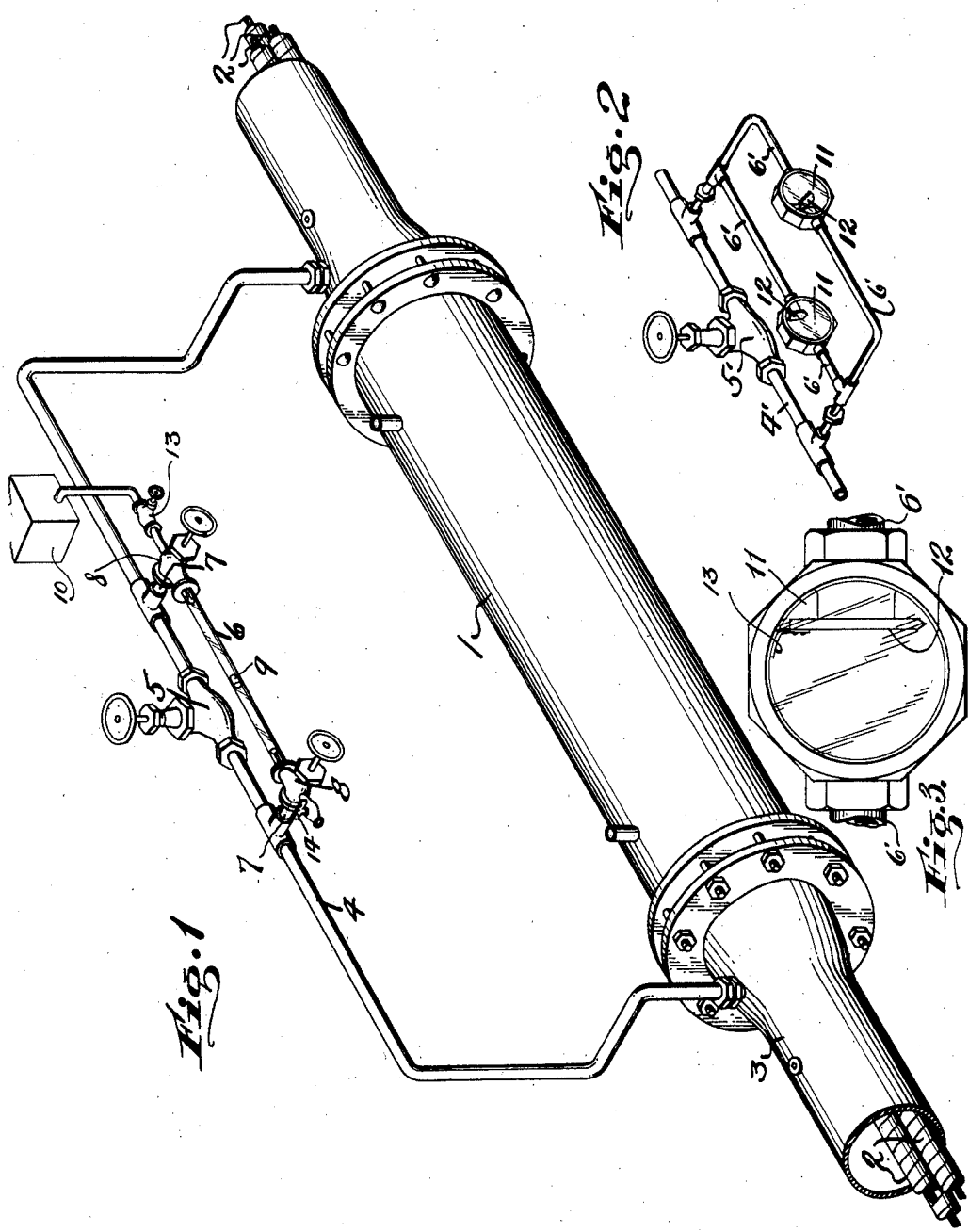
INVENTOR.
Charles E. Bennett
BY
Kiddle, Marques and Hornidge,
ATTORNEYS.

Patented June 9, 1936

2,043,227

UNITED STATES PATENT OFFICE 2,043,227

LEAK INDICATING APPARATUS FOR OIL FILLED ELECTRIC POWER CABLES

Charles E. Bennett, Hawthorne, N. J., assignor to The Okonite-Callender Cable Company, Incorporated, Paterson, N. J., a corporation of New Jersey Application January 20, 1934, Serial No. 707,444

2 Claims. (Cl. 137—77)

This invention relates to electric power cables of the oil filled type and is particularly well adapted for use in connection with electric power cable systems of the type disclosed in my copending application Serial No. 553,714, filed July 29, 1931.

My invention provides a structure or apparatus adapted to be applied to an oil filled cable system whereby an oil leak in the system can be detected and the direction of the leak with respect to the detector readily determined.

More specifically the present invention provides for installing suitable apparatus at the joints of a power transmission system of the oil filled type whereby the location of the leak with respect to the joint will be indicated.

Two embodiments of my invention are shown in the accompanying drawing:

Fig. 1 showing one embodiment of the invention;

Fig. 2 a modification; while

Fig. 3 is an enlarged elevational view of one of the valves of Fig. 2.

Referring first of all to Fig. 1 of the drawing, I designates a stop joint or a semi-stop joint in a cable system of the type in which the insulated but unsheathed conductors 2 of the cable are enclosed in a relatively large pipe line 3 which is filled with oil maintained under high pressure, say around 200 pounds, the unsheathed cable conductors being loosely disposed within this pipe line and submerged in the oil.

Connected to the pipe line 3 at each side of the joint I and in communication with the interior of the pipe line 3 is a pipe 4 equipped with a valve 5, normally open. Connected across the pipe 4 at each side of the valve 5 is a transparent sight tube 6. This tube is connected to the pipe 4 by valve controlled couplings 7, the valves being designated 8. In the tube 6 is a float 9 such as a cork or pith ball.

Normally the valves 8 are closed, and as mentioned above the valve 5 open.

To determine whether or not there is a leak in the pipe line 3 at either side of the joint I and between this joint and the next joint at each side of the joint I it is merely necessary to close the valve 5 in the pipe 4 and to open the valves 8. If there be a leak in the pipe line to the right of the joint I, for example, then it will be apparent that there will be a flow of oil through the pipe 4 and sight tube 6 to move the float 9 to the right. By the same token a leak in the line to the left of the joint I will effect movement of the float 9 to the left.

If desired a colored liquid may be injected into the transparent tube 6 and the movement of this liquid will show the direction of the leak. For this purpose a container 10 may be connected to one end of the tube 6 through valve-controlled connection 13. The other end of the tube is equipped with a petcock 14. In testing for a leak the valves 5, 7, 8 and 13 are closed. Petcock 14 is opened to drain the tube 6. Valve 13 is then opened to admit colored liquid from tank 10, valves 13 then closed and valves 8 opened, whereupon the colored liquid in the tube will move toward the leak.

It has been found that this apparatus is very sensitive and that small leaks can be readily detected. It will be understood of course that the apparatus is installed at each stop joint or semi-stop joint along the system.

The apparatus above described may be varied in construction as illustrated in Figs. 2 and 3.

In this construction I provide two pipe lines 6' in shunt to the pipe 4', the latter corresponding to the pipe 4 of Fig. 1. Each of the pipes 6' is provided with a sight gauge 11. Within each of these gauges 11 at the end of the pipe 6' is a flap valve 12. Each of these valves is held to its seat by a spring 13 which may be adjustable so as to enable the valve to be held closed under predetermined spring pressure. In the event of a leak in the system it will be apparent that upon closure of the valve 5' in the pipe 4' oil will flow through one or the other of the pipes 6', depending upon at which side of the valve 5' the leak is located. An opening of one or the other of the valves 12 determines the direction of flow of the oil. In the drawing Fig. 2 I have shown the valve 12 which is most remote from pipe 4' open, which indicates there is a leak in the system to the right of valve 5'.

In both embodiments of my invention above described it will be apparent that if a leak occurs in a system employing my invention, it is merely necessary to test the system at each joint as above described until the location of the leak with respect to adjacent joints is determined.

What I claim is:—

1. A device for indicating leaks in oil filled electric power cables, said indicator comprising in combination a pipe adapted to be placed in communication with the interior of the cable in shunt to the cable, a transparent tube connected in shunt to said pipe, valves for normally preventing the movement of the oil of the cable through said transparent tube, another valve for preventing movement of the cable oil except through said tube, and a float in said transparent tube adapted to be actuated in the direction of a leak in the cable by oil flow through the transparent tube toward the leak.

2. In combination a pipe line filled with oil, oil filled electric power cables in said pipe line, joints in said pipe line, a pipe having its ends connected to and in communication with the interior of said pipe line at opposite sides of said joint, a valve in said pipe, a transparent tube connected in shunt to said pipe, valves for normally preventing movement of the cable oil through said transparent tube, another valve for preventing movement of the cable oil except through said transparent tube, and a float in said transparent tube adapted upon opening of the first mentioned valves and closure of the last mentioned valve to be moved in the direction of a leak in said pipe line by oil flow through the transparent tube toward the leak.

CHARLES E. BENNETT.